United States Patent
Tellier

[15] 3,703,908
[45] Nov. 28, 1972

[54] SQUIRT CLEANING POPPET VALVE AND SEAT

[72] Inventor: Gilbert F. Tellier, Canoga Park, Calif.

[73] Assignee: The United States of America as represented by the Secretary of the Air Force

[22] Filed: July 26, 1971

[21] Appl. No.: 166,136

[52] U.S. Cl..............137/238, 251/333, 137/DIG. 5
[51] Int. Cl..................................................F16k 1/36
[58] Field of Search ......251/332, 333; 137/237, 238, 137/516.25, 516.27, DIG. 5

[56] References Cited

UNITED STATES PATENTS

| 1,884,442 | 10/1932 | Wells et al. | 251/333 X |
| 1,218,030 | 3/1917 | Witmer | 251/333 X |
| 1,962,558 | 6/1934 | Guildford | 251/333 X |
| 246,132 | 8/1881 | Hastings | 251/333 X |
| 224,133 | 2/1880 | Brazier | 251/333 |
| 855,517 | 6/1907 | Lippy et al. | 251/333 |

Primary Examiner—Alan Cohan
Assistant Examiner—Gerald Michelsky
Attorney—Harry A. Herbert, Jr. et al.

[57] ABSTRACT

A poppet valve and seat, in a particle-entrained fluid flow system, which at closure cause a squirt which, by flushing action, prevents particles from remaining on the sealing interfaces of the poppet valve and of the seat.

1 Claim, 1 Drawing Figure

PATENTED NOV 28 1972 3,703,908
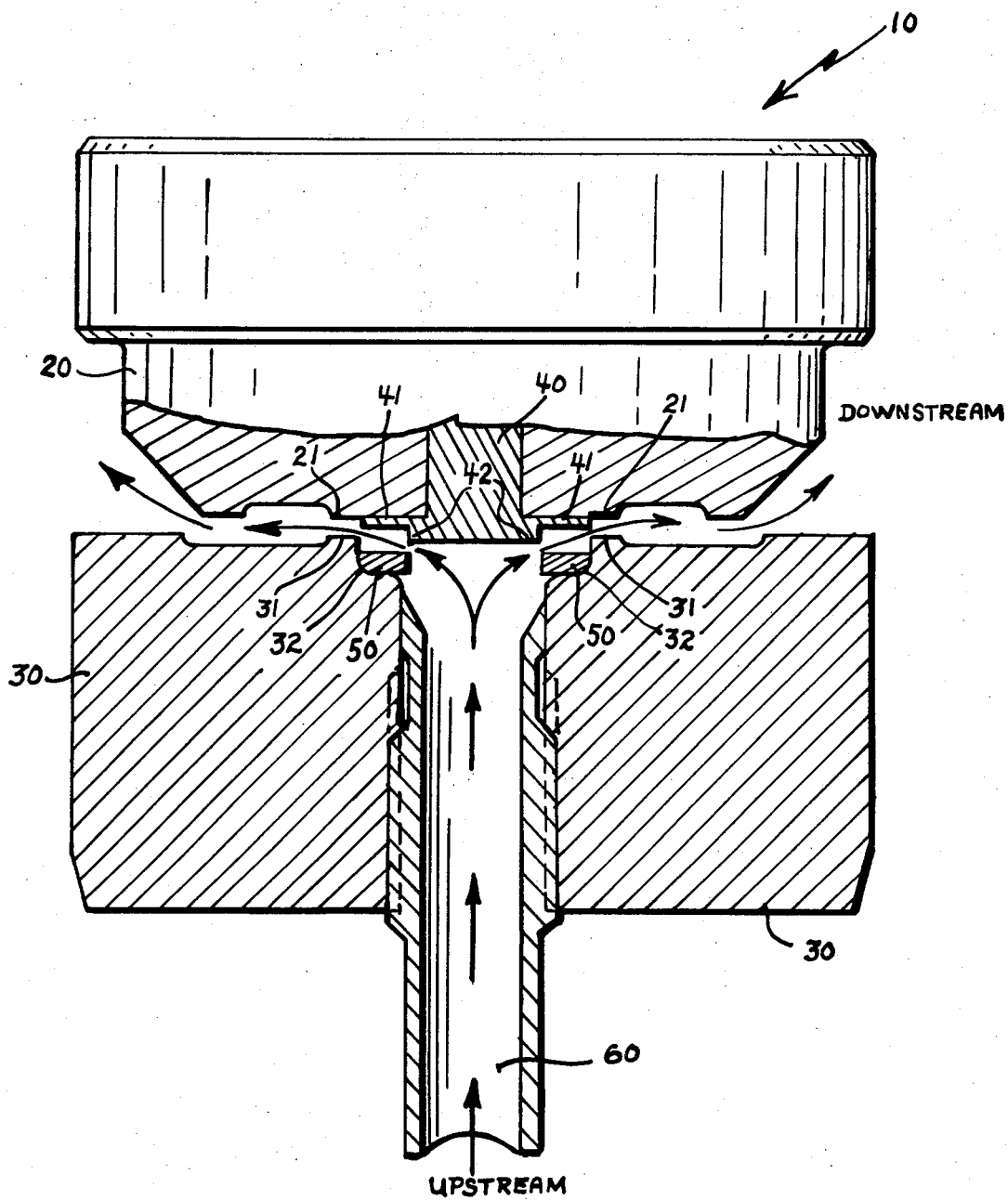
INVENTOR.
GILBERT F. TELLIER
BY Harry A. Herbert Jr.
and Arsen Tashjian
ATTORNEYS

SQUIRT CLEANING POPPET VALVE AND SEAT

BACKGROUND OF THE INVENTION

This invention relates to a poppet valve and seat in a particle-entrained fluid flow system.

In such a system, at closure of the poppet valve and seat, particles from the fluid remain on the sealing interfaces of the poppet valve and seat and, thereby, result in damage to the valve and seat and also result in excessive leakage between valve and seat. Further, inherent in such a system are large closure impact forces which adversely affect the valve and seat.

This invention eliminates these problems and disadvantages and, therefore, constitutes a significant advance in the state-of-the-art.

SUMMARY OF THE INVENTION

This invention pertains to a novel poppet valve and seat for use in a system where the fluid flowing therein is particle-entrained.

An object of this invention is to prevent particles in the fluid flow from remaining on the sealing interfaces of the valve and seat at closure and, thereby, to prevent damage to the valve and seat and also to prevent excessive leakage between valve and seat.

Another object of this invention is to prevent large impact closure forces when the valve and seat are closing.

These objects, and other and related ones, of this invention will become readily apparent after a consideration of the description of the invention and reference to the drawing.

DESCRIPTION OF THE DRAWING

The drawing is a side elevation view, partially in cross-section and schematic in form, of a preferred embodiment of the invention.

DESCRIPTION OF THE PREFERRED EMBODIMENT

With reference to the drawing, therein is shown preferred embodiment 10 of the invention.

Embodiment 10 includes poppet valve 20 and valve seat or closure element 30 which mates with valve 20 at annular sealing surfaces or interfaces 21, i.e., of the valve, and 31, i.e., of the seat.

Valve 20 has, at the geometric center of the valve face, an insert 40 with concentric annular shoulders 41 and 42.

Seat 30 has a conduit 60 in its geometric center. Conduit 60 is connected to a source (not shown) of particle-entrained fluid. The fluid flows in conduit 60. In that regard, the flow of the particle-entrained fluid in conduit 60 is in the direction shown by the arrows in the drawing, and the upstream and downstream directions of the fluid flow are as indicated in the drawing.

Seat 30 has, at the exit end of conduit 60, a counterbore or recess 32 in which is positioned a ring or annular insert 50.

MODE OF OPERATION OF THE PREFERRED EMBODIMENT

When valve 20 and seat 30 close, they mate at sealing interfaces 21 and 31, and an annular chamber is formed by shoulder 41, shoulder 42, ring 50, and the inside vertical surface of recess 32.

During the closing action, a small quantity or volume of particle-entrained fluid is trapped within the chamber which is being formed.

At closure, because of the close fit between the inside vertical surface of recess 32 and shoulder 41, and because of the close fit between the inside vertical surface of ring 50 and shoulder 42, particles in the fluid are retained within the chamber, but the fluid therein is forcibly ejected, particle-free and in a squirting action which has a flushing effect, across sealing interfaces 21 and 31, purging out and removing any particles which are entrapped between interfaces 21 and 31.

Additionally, as a result of the squirting action, closure forces are limited, i.e., valve 20 and seat 30 do not slam. Also, as a result of the squirting action and of the ensuing removal o particles between sealing interfaces 21 and 31, the valve 20 and seat 30 are not damaged at sealing interfaces 21 and 31, as they would be by impact if there were particles from the fluid on sealing interfaces 21 and 31. Further, there is no excessive leakage between valve 20 and seat 30, as there would be if particles were on sealing interfaces 21 and 31.

When valve 20 and seat 30 open, the entrapped fluid and the particles which were retained within the chamber are flushed downstream.

While there have been shown and described the fundamental features of the invention, as applied to a particular embodiment it is to be understood that various substitutions and omissions may be made by those of ordinary skill in the art without departing from the spirit of the invention

What is claimed is:

1. An apparatus, adapted for use in a fluid flow system wherein the fluid contains particles, comprising:
   a. a poppet valve having, at the valve face, an insert with two concentric annular shoulders, with said valve having a sealing interface; and
   b. a valve seat having a conduit in which flows the particle-entrained fluid, and a counterbore surrounding the exit end of the conduit, in which counterbore is positioned a ring, with said valve seat having a sealing interface which mates with the sealing interface of said valve when said valve and said valve seat close;
   with said poppet valve and said valve seat so positioned and so dimensioned that, when said valve and said seat are closing and as said valve sealing interface is mating with said valve seat sealing interface, a chamber is formed by said two concentric annular shoulders of said valve, by said ring, and by said counterbore, and particle-entrained fluid is trapped within said chamber, and particle-free fluid is squirted out from said chamber by the closing action, thereby flushing and removing any particles which are between the said sealing interfaces.

* * * * *